April 5, 1966  D. E. COLVILL  3,244,900
A.C. GENERATOR SIGNAL LIGHT AND FIELD RELAY SYSTEM
Filed July 15, 1963
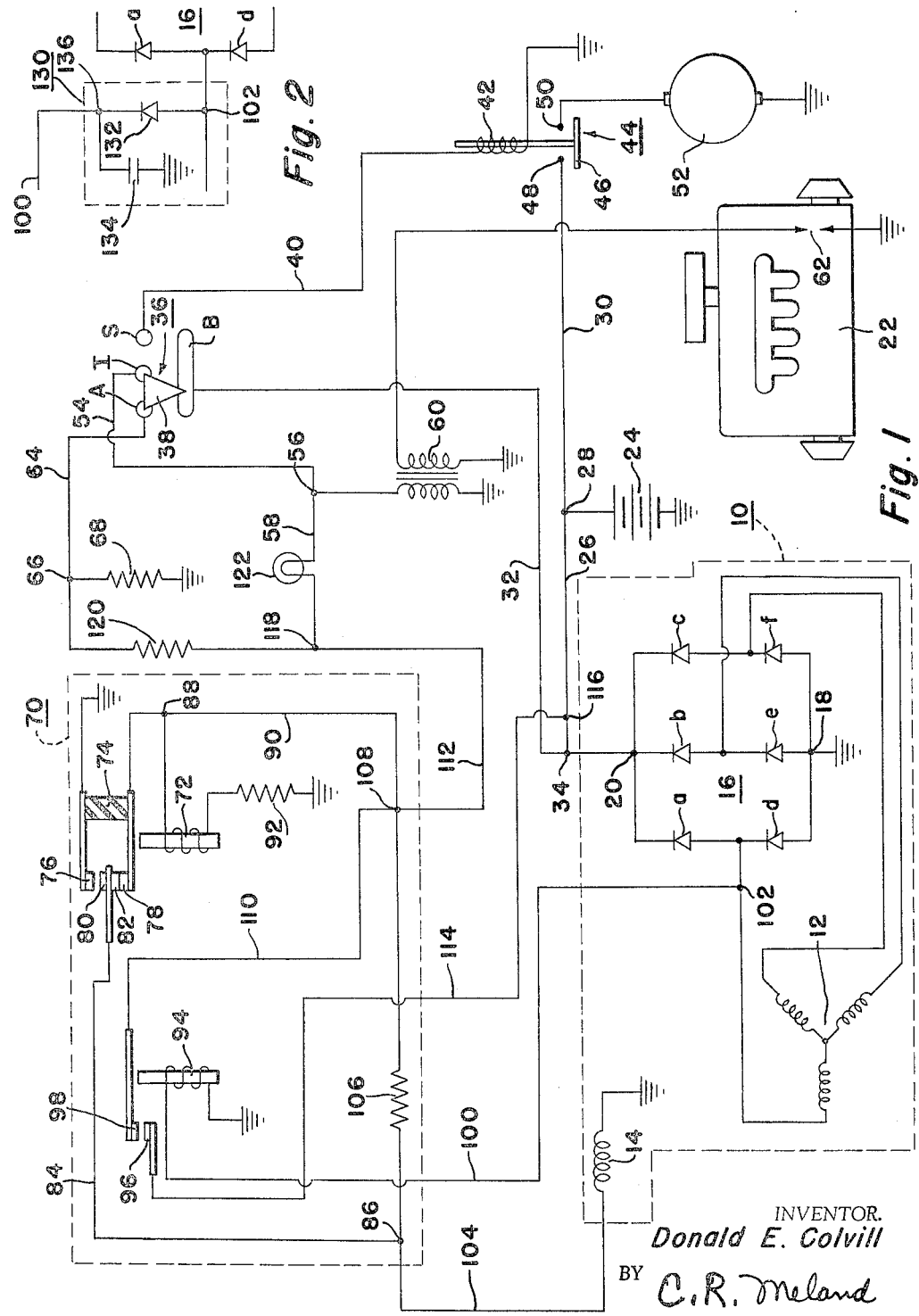
INVENTOR.
Donald E. Colvill
BY C. R. Meland
His Attorney United States Patent Office 3,244,900
Patented Apr. 5, 1966

3,244,900
A.C. GENERATOR SIGNAL LIGHT AND
FIELD RELAY SYSTEM
Donald E. Colvill, Anderson, Ind., assignor to General Motors Corporation, Detroit, Mich., a corporation of Delaware
Filed July 15, 1963, Ser. No. 295,122
11 Claims. (Cl. 307—10)

This application is a continuation-in-part of my co-pending application Serial No. 204,863, filed on June 25, 1962, and now abandoned, and assigned to the assignee of this invention.

This invention relates to an electrical system for motor vehicles and the like and more particularly to a system that has an A.C. generator connected with diodes as a source of power and wherein the system includes a field relay and a signal lamp that indicates whether or not the generator-diode combination is developing a predetermined voltage.

One of the objects of this invention is to provide a power system of the type described wherein the field winding of the A.C. generator is initially energized from a battery through a circuit that includes a parallel connected resistor and signal lamp and includes the voltage regulator.

Another object of this invention is to provide an electrical system wherein the field winding of an A.C. generator is initially energized from a battery through a circuit that includes an ignition switch, a parallel connected resistor and signal lamp and a voltage regulator, the system having a relay that completes a bypass circuit for bypassing the ignition switch and parallel connected resistor and signal lamp when the output voltage of the generator rises to a predetermined value.

A further object of this invention is to provide an electrical system wherein the field winding of the A.C. generator is initially energized from the battery through parallel paths provided in part by an accessory contact and an ignition contact of an ignition switch, the parallel paths including a resistor connected in series with the accessory contact and a signal lamp connected in series with the ignition contact.

Still another object of this invention is to provide an electrical system wherein the field winding of the A.C. generator can be initially energized from the battery through an energizing circuit that includes an ignition switch and wherein the energizing circuit is bypassed or shorted by a circuit that includes relay contacts which close when the generator comes up to voltage, the system being arranged to prevent undesirable feed back circuits when the relay contacts close.

In carrying forward the objects of this invention, the relay coil which controls the bypassing of the ignition switch and the parallel connected resistor and signal lamp is preferably energized by connecting the relay coil between one D.C. terminal of a three phase full wave bridge rectifier network that is energized by the A.C. generator and a junction point of two diodes which is connected with one of the phase windings of a three phase output winding of the generator. This connection can take the form of a conductor but in some cases, it has been found that this relay may produce a humming noise due to the fact that it is being energized by a square wave pulse.

It therefore is another object of this invention to provide a circuit which is capable of reducing or eliminating the humming noise that may occur in the relay. This circuit preferably includes a diode which is connected between the relay coil and the junction of two diodes of the bridge rectifier that is connected with one of the phase windings of the A.C. generator. This circuit also includes a capacitor which is connected across the relay coil and which receives charging current from the diode during the positive square wave pulses. When there is no current being supplied to the relay coil through the diode or rectifier, the capacitor discharges through the relay coil which tends to maintain a steady current through the relay coil which in turn eliminates the humming noise.

Further objects and advantages of the present invention will be apparent from the following description, reference being had to the accompanying drawings wherein preferred embodiments of the present invention are clearly shown.

In the drawings:

FIGURE 1 is a schematic circuit illustration of an electrical system made in accordance with this invention.

FIGURE 2 illustrates a circuit that can be incorporated into FIGURE 1 to eliminate relay humming noise.

Referring now to the drawings, the reference numeral 10 has been used to generally designate the power source for the electrical system of this invention. This power source includes an alternating current generator having a three phase Y-connected output winding 12 and a field winding 14. The three phase output winding 12 is connected with a three phase full wave bridge rectifier network 16 having one D.C. output terminal 18 which is grounded and having another D.C. output terminal 20. The A.C. generator which includes the field winding 14 and the three phase output winding 12 may be of any well-known type and may be of the type wherein the output winding 12 is the stator winding and the winding 14 is part of a rotor. The rotor 14 is driven by an engine 22 of a motor vehicle. The term motor vehicle is intended to include land vehicles or those which are moved over water or through air.

The power source 10 supplies power to various loads on the motor vehicle, one of which is a storage battery designated by reference numeral 24. It is seen that one side of the storage battery is connected directly to ground and it is also seen that the output terminal 20 of bridge rectifier 16 is connected directly to one side of the battery through lead wire 26. It is noted that there is no load relay or cut out relay provided since the diodes of the bridge rectifier 16 prevent the battery from discharging through the A.C. generator. These diodes that form the bridge rectifier 16 are preferably of the PN junction semiconductor type and may be of the silicon type.

It is seen that one side of the battery is connected with the junction 28 and this junction is connected with a lead wire 30. The lead wire 26 is connected with a lead wire 32 at junction 34 and the lead wire 32 is also connected with the battery contact B of an ignition switch which is generally designated by reference numeral 36. The ignition switch 36 in addition to the battery terminal or contact B has an accessory contact A, and ignition contact I and a starter or solenoid contact S. The switch 36 includes a triangularly shaped manually movable contact 38 which controls the connection of the battery contact B with the contacts A, I and S. In the off position of the switch 36, the manually movable contactor 38 is completely disconnected from the battery terminal B but may engage one of the other terminals for example, the terminal A.

With the switch contactor 38 in the position shown in the drawing, it is seen that the battery contact B is connected with the accessory contact A and the ignition contact I. If the contactor 38 is shifted rightwardly in the drawing, it can be moved to a position wherein the battery contact B is connected to the ignition contact I and the solenoid contact S.

The actual construction of the ignition switch 36 may be similar to that shown in the patent to Brown, et al., 2,655,570, with the exception that in the Brown, et al. patent, the accessory and solenoid contacts are shown connected in the off position of the switch. In the switch as shown in the drawing, the contacts A and S are not connected by contactor 38 in the off position of the switch. It will of course be appreciated that the ignition switch can take various forms and will work with the system of this invention as long as the switch has accessory and ignition terminals.

The contact S of ignition switch 36 is connected with a lead wire 40 and this lead wire is connected to the solenoid coil winding 42 of an electric starter which is designated by reference numeral 44. One side of the solenoid coil winding 42 is grounded and this coil winding shifts a movable contactor 46 into engagement with fixed contacts 48 and 50. The fixed contact 48 is connected with lead wire 30 whereas the fixed contact 50 is connected with the starting motor 52. One side of the starting motor 52 is grounded as shown. The starter 44 may be of the type where the solenoid 42 operates to shift a pinion of the starter into mesh with the ring gear of the engine 22. The starter of course could be of other types and is controlled in any event by a connection of the battery contact B with the contact S of the ignition switch 36.

The ignition contact I of the ignition switch 36 is connected with junction 56. The junction 56 is connected with lead wire 58 and also supplies the ignition circuit for the engine 22. In order to illustrate this, an ignition coil 60 is shown which has a secondary winding connected with a spark plug 62 of the engine. It will of course be appreciated by those skilled in the art that the ignition system must include breaker contacts and a distributor and these have not been shown to simplify this disclosure.

The accessory contact A of ignition switch 36 is connected with lead wire 64 which in turn is connected with junction 66. Connected between junction 66 and ground are the accessory loads 68 which have been illustrated as a resistor. These accessory loads 68 may include, for example, the radio and turn signal lamps on a motor vehicle.

The regulator of the electric system of this invention is generally designated by reference numeral 70 and includes a voltage regulator and a field relay. The voltage regulator is of the double contact type and includes a coil winding 72 and a movable armature 74. The armature 74 includes relay contact arms which carry contacts 76 and 78 that cooperate with the fixed contacts 80 and 82. It is seen that the contact arms are insulated from each other and the armature 74 is biased by a spring, not shown, to a position where the fixed contact 82 engages the contact 78. The fixed contacts 80 and 82 are both connected with lead wire 84 which in turn is connected with junction 86. The contact 76 is grounded as shown and the contact 78 is connected with junction 88. The junction 88 is connected with a lead wire 90 and with one side of the relay coil 72. The opposite side of the relay coil 72 is connected to ground through resistor 92.

The field relay includes a relay coil winding 94, a fixed contact 96 and a movable armature carrying a contact 98 that engages the fixed contact 96 when the relay coil 94 is energized sufficiently.

One side of the relay coil winding 94 is grounded and an opposite side of this relay coil winding is connected with lead wire 100. The lead wire 100 is connected with a junction 102 which is between two of the diodes of bridge rectifier 16 and is connected with one of the phase windings of the output winding 12. The relay coil 94 thus will be energized between junction 102 and ground when the A.C. generator is producing an output voltage. When this voltage reaches a predetermined value, contacts 96 and 98 will close, the result of which is more fully described hereinafter.

The junction 86 is connected with a lead wire 104 which in turn is connected to one side of the field winding 14. The opposite side of the field winding 14 is grounded as shown. The junction 86 is also connected to one side of a resistor 106 and this resistor is connected with the junction 108. The junction 108 is connected with the lead wire 90 and is also connected with lead wires 110 and 112. The lead wire 110 is connected with the armature of the filed relay.

The fixed contact 96 of the field relay is connected with lead wire 114. The lead wire 114 is connected with a junction 116 which is between the battery 24 and the output terminal 20 of the bridge rectifier. In the physical wiring of the motor vehicle, the junction 116 should be as close as possible to the insulated terminal of the battery.

The lead wire 112 is connected with a junction 118. A resistor 120 which may be, for example, a 110 ohm resistor is connected between junction 118 and the junction 66. This resistor thus is connected to the accessory contact A of the ignition switch 36. The junction 118 is also connected with a signal lamp 122, the opposite side of the signal lamp being connected with lead wire 58. This signal lamp 122 may be a 12 volt lamp which has a two candle power rating. The resistance of the lamp may be, for example, 38 ohms at 6 volts and 53 ohms at 12 volts. It is seen that the lamp is connected with the ignition terminal of the ignition switch 36 through lead wire 58, junction 56 and lead wire 54.

When the operator of the motor vehicle desires to start the engine 22, the contactor 38 is shifted from its off position rightwardly in the drawing to first connect the battery contact B with contacts A and I and upon further rightward movement connects the battery contact B with contacts I and S. When contacts I and S are connected with the battery contact B, the starting motor 52 is energized from the battery 24 through lead wire 30 to crank the engine 22. The ignition circuit is energized from the battery through contact I, lead wire 54 and junction 56. When the engine starts, the operator releases the ignition switch so that contactor 38 moves to the position illustrated in the drawing.

With the contactor 38 in the position illustrated, in the drawing, it can be seen that the field winding 14 will be initially energized from the battery 24 to cause the A.C. generator to build up. This energizing circuit can be traced from junction 28 through lead wire 26, through junction 34, through lead wire 32, through battery contact B, through contactor 38, and then to the accessory contact A and the ignition contact I. At this point, the energizing current for the field winding flows through two parallel branches. One of these parallel branches is through contact I, lead wire 54, lead wire 58 and through signal lamp 122 to junction 118. The other parallel branch is through accessory contact A, lead wire 64 and resistor 120 to junction 118. From junction 118, the circuit can be traced through lead wire 112, junction 108, lead wire 90, contact 78 and fixed contact 82, lead wire 84, junction 86, and then through lead wire 104 to the field winding 14. The resistance to flow of current from the battery 24 through the field winding 14 is the resistance of the parallel connected resistor 120 and lamp 122 and other series resistance of the leads. This overall resistance is of such a value as to allow sufficient energization of the field winding 14 so that the A.C. generator can build up.

When the A.C. generator builds up to a predetermined voltage, the relay coil 94 is energized sufficiently to cause the contact 98 to engage fixed contact 96. When these contacts close, it is seen that the initial energizing circuit for the field winding 14 is now bypassed through lead wire 114. The circuit for energizing the field winding 14 will now be from junction 116, through lead wire 114, through contacts 96 and 98, through lead wire 110 to junction 108, through lead wire 90 and then through contact 78 to fixed contact 82, then through lead wire 84, through junction 86, and through lead wire 104 to field winding 14. It is seen that the voltage regulator now senses the voltage of junction 116 with respect to ground since the relay coil winding 72 is connected with lead wire 90 at junction 88.

The voltage regulator operates to control the energization of the field winding 14 to maintain the voltage appearing between junction 116 and ground substantially constant. At times, the armature 74 is moved to cause the contact 78 to vibrate into and out of engagement with fixed contact 82. Under certain other conditions of operation, the contact 76 is vibrated into and out of engagement with the fixed contact 80. This type of regulator is well-known to those skilled in the art and is sometimes called a double contact regulator.

In the system of this invention, it is very important that the signal light 122 be connected with the ignition contact I and that the resistor 120 be connected with the accessory contact A. If wrong connections are made, feed-back circuits can be set up which are detrimental to the operation of this system. As an example, if the resistor 120 were connected with the ignition contact I, the engine might never stop when the contactor 38 of the ignition switch is shifted to a position to disconnect the battery contact B from the ignition contact I. To pursue this further, assume that the engine is running and that the resistor 120 were connected with the ignition contact I. With the engine running and the A.C. generator putting out its rated output voltage, the contact 96 is in engagement with the contact 98. If the contactor 38 were now shifted to a position to presumably kill the ignition circuit, a circuit still could be made to junction 56 through resistor 120 if it were connected to the ignition contact I. This supposed circuit would be from junction 116, through lead wire 114, through contacts 96 and 98, through lead wire 110, through lead wire 112 and through resistor 120 to junction 56. It can be seen that the result of such a wrong connection would be to maintain the ignition circuit energized and the engine could therefore not be turned off even though the battery contact B were disconnected from the ignition contact I.

It can be seen from the foregoing that an electrical system has been provided for a motor vehicle which is capable of initially energizing the field winding of the A.C. generator from the battery and through contacts of the ignition switch. This circuit is partially through the signal lamp, and when the contact 96 engages the contact 98, the signal lamp 122 and the resistor 120 are bypassed to provide a new circuit for energizing the field winding. It is, of course, pointed out that when the signal lamp 122 is bypassed, it will be extinguished to indicate to the operator of the motor vehicle that the alternator is developing its normal output voltage. If the signal lamp should remain incandescent, there is some trouble in the electrical system.

The electrical system of this invention is designed such that the lighting of the signal lamp can indicate a wide variety of troubles and these troubles and the method of their indication will now be described.

One of the troubles that can be indicated by the electrical system of this invention is the occurrence of shorted positive diodes, that is, where certain of the diodes 16a, 16b or 16c become shorted. If this type of failure occurs during generator operation, the voltage at the tap 102 connected between diodes 16a and 16d will increase causing the relay contacts 96 and 98 to seal more tightly, and there therefore is no indicator light reaction.

However, once the diode is shorted, the indicator light will be on whenever the ignition switch is off for a voltage will be impressed across the relay coil 94 via a path directly through one of the shorted diodes or through the shorted diode and two of the low resistance stator phase windings. As an example, assume that diode 16a is shorted. A circuit then can be traced for relay coil 94 from junction 28, junction 116, junction 34, junction 20, through diode 16a, junction 102, through lead wire 100, and through relay coil 94 to ground. The relay contacts 96 and 98 will be closed and an energizing circuit for the signal lamp 122 can now be traced from junction 28, junction 116, lead wire 114, closed contacts 96 and 98, lead wire 110, junction 108, lead wire 112, junction 118, signal lamp 122, junction 56 and then through the primary winding of the ignition coil 60 to ground. It will be appreciated that the circuit for the signal lamp from lead wire 58 to ground could be made through other electrical loads, for example, a panel light or an oil pressure light. It can be seen from the foregoing that when the ignition switch 36 is in the off position and some load is present on the ignition side of the ignition switch, the indicator light 122 will be on to indicate a shorted diode. An additional indication is obtained when the car is started, for when the ignition switch is closed, and before the engine is cranked, the indicator light will be out whereas it normally should be momentarily on at this time.

If the negative diode 16d should become shorted, the voltage at junction 102 will drop sufficiently to cause the relay contacts 96 and 98 to open and therefore give an immediate indication when the engine is running. The signal lamp, of course, will light when the contacts 96 and 98 open. If negative diodes 16e and 16f should become shorted, however, the phase voltage at junction 102 will not drop sufficiently to cause relay contacts 96 and 98 to open and there will be no immediate indication when the engine is running. However, if the engine is stopped and restarted with a shorted negative diode, the A.C. generator will not build up and the phase tap voltage at 102 will not be sufficient to close relay contacts 96 and 98 to extinguish the lamp 122. It can be seen from the foregoing that all of the negative diode shorts will be indicated if they failed before the engine is started and the shorting of diode 16d will be indicated even when the engine is running.

If the diode 16d should open and if a load is present other than the battery and ignition loads, the voltage at tap 102 will drop sufficiently to open relay contacts 96 and 98 and to therefore cause the signal lamp 122 to be energized.

If diodes 16e and 16f become open, there will be no immediate indication of this by the signal lamp 122. However, if the engine is stopped and restarted with this type of failure, the signal lamp 122 will stay on as long as the generator is driven in the idle speed range. Once this speed range is exceeded, the signal lamp will go out and will stay out until the engine is stopped and restarted. From the foregoing, it can be seen that all of the negative diode openings will be indicated in the idle speed range of the engine if they fail before the engine is started. The opening of diode 16a will be indicated immediately if some accessory load is being energized.

If the end of the phase winding, which is connected with junction 102, should become grounded, the effect will be the same as a shorting of the negative diode 16d and the indication will be the same as explained above for a shorting of this diode. In other words, the voltage at the tap 102 will drop sufficiently to cause the relay contacts 96 and 98 to open and therefore give an immediate indication.

If a diode or the phase windings should become grounded, at points where the diodes are not connected to the junction 102, and if the engine is stopped and restarted with this failure, the A.C. generator may build up to turn out the light. In general, there will be no indication if at some low speed of the engine the voltage at the light relay coil 94 is sufficient to cause the relay contacts to close and turn out the indicator light. The closure of contacts 96 and 98 will depend on the state of charge of the battery, system load and the specific setting of the relay 94. If the battery is well charged, and the system load is low and the relay setting is lower than nominal, the indicator lamp 122 will be likely to go out before an indication is obtained.

If the stator should become open, the drop in voltage at the tap 102 is normally not sufficient to cause an immediate indication. If the engine is now stopped and restarted, with this failure, the indicator lamp 122 will stay on as long as the A.C. generator is driven in the idle speed range. This range will depend upon the electrical balance of the A.C. generator and the setting of the relay. Once this speed is exceeded, the light will go out and will stay out until the engine is stopped and restarted.

If the field winding 14 becomes grounded at the high voltage side, the output of the A.C. generator will drop to zero, the phase voltage at junction 102 will drop, and the relay contacts 96 and 98 will open, grounding the indicator lamp 122 through the grounded field. If the field 14 should become grounded at its grounded end, the performance of the A.C. generator will not be materially affected and there will be no indication of a failure.

If the belt which drives the generator from the engine should break, the A.C. generator will have no output and the indicator light 122 will be energized through field winding 14 and voltage regulator coil 72.

If the phase windings should become shorted to each other or if one of the stator windings should be shorted out entirely, the voltage at tap 102 drops slightly, but not enough to cause the lamp 122 to become lighted. However, if the engine is stopped and restarted with this type of failure, the light will stay on as long as the generator stays in the idle speed range and this range will depend on the electrical balance of the A.C. generator and the setting of the relay. Once this speed range is exceeded, the lamp 122 will go out and will stay out until the engine is stopped and restarted. If the phase winding short encompasses only a few turns of the phase windings, the output of the A.C. generator will not be appreciably affected and there will be no light indication. If the short is of a severity between the two extremes mentioned above, the indication will be a compromise depending upon its severity.

It can be seen from the foregoing that the signal lamp 122 performs the function of indicating many troubles that might occur in the generating system of this invention and also forms a part of an energization circuit for initially energizing the field winding 14.

The relay coil 94 has been illustrated as being connected between the junction of two diodes 16a and 16d and one D.C. output terminal of the bridge rectifier network. It will be appreciated that this coil can be energized in other ways without departing from the spirit and scope of this invention. As one example, the lead wire 114 could be connected to the neutral point of the three phase winding 12 rather than to the junction of diodes 16a and 16d.

Referring now to FIGURE 2, a circuit is illustrated which can be incorporated into the circuit of FIGURE 1 to reduce relay humming noise that sometimes occurs during energization of the relay coil 94. The circuit 130 of FIGURE 2 is connected between relay coil 94 and junction 102 as is clearly apparent from FIGURE 2. This circuit includes a diode 132, the anode of which is connected with junction 102. The cathode of diode 132 is connected with junction 136 which in turn is connected with conductor 100 that goes to one side of the relay actuating coil 94. A capacitor 134 is connected between junction 136 and ground.

The relay coil 94 is energized with reoccurring voltage pulses and there is a constant increase and decrease of the pull on the armature 98 which at times causes an objectionable relay noise in the relay 94. This noise is reduced by using the circuit 130 shown in FIGURE 2. In FIGURE 2, the capacitor 134 becomes charged at the same time that current is being supplied to the relay coil 94 through diode 132. During the negative part of the cycle, the capacitor 134 discharges into the relay coil 94 keeping up the current flow thereto. This causes current to be supplied to the relay coil 94 in a more steady fashion and if the capacitor 134 has a sufficiently high capacitance, the current supplied to the relay coil 94 approaches direct current. The diode 132 prevents the discharging of the capacitor through a lower resistance path once it has been charged during a positive cycle.

Where the circuit 130 is used, the wattage rating of the relay 94 must be increased as compared to the FIGURE 1 situation where the conductor 100 directly connects junction 102 and relay coil 94. This is due to the fact that with the use of circuit 130, the average D.C. current supplied to the relay coil 94 is increased as compared to the FIGURE 1 situation where it is supplied with square wave pulses.

While the embodiments of the present invention as herein disclosed, constitute a preferred form, it is to be understood that other forms might be adopted.

What is claimed is as follows:

1. An electrical system comprising, an A.C. generator having a field winding and an output winding, an engine for driving said generator, rectifier means connected with said output winding for converting the A.C. voltage induced in said output winding to direct current, a battery, means connecting said rectifier means with said battery, an energizing circuit for initially energizing said field winding from said battery, said energizing circuit including manually operable switch means having two output terminals providing two parallel current paths respectively for a resistor and a signal lamp, an ignition system for said engine, one of said output terminals that is connected with said signal lamp being connected to said ignition system, a bypassing circuit for bypassing said manually operable switch means and said parallel connected resistor and signal lamp, and means for closing said bypassing circuit in response to the development of a predetermined voltage by said A.C. generator.

2. In a motor vehicle electrical system, the combination comprising, an alternating current generator having a three phase output winding and a field winding, an engine for driving said generator, a battery, a three phase full wave bridge rectifier network having output terminals connected with said battery and input terminals connected with said output winding, an ignition switch having a battery contact, an accessory contact and an ignition contact, an ignition system for said engine connected with said ignition contact, means connecting said battery contact with one side of said battery and with one of the output terminals of said bridge rectifier network, and an energizing circuit for initially energizing the field winding of said generator, said energizing circuit including a resistor connected between said field winding and said accessory contact and including a signal lamp connected between said field winding and said ignition contact, said signal lamp when energized having a higher electrical resistance than said resistor to prevent feedback to said ignition system when said ignition switch is in a position where said battery and ignition contacts are disconnected.

3. A motor vehicle electrical system comprising, an A.C. generator having a three phase output winding and a field winding, a storage battery, a three phase full wave bridge rectifier network having output terminals connected with said storage battery and having input terminals connected with said output winding, an ignition switch having a battery contact, an accessory contact and an ignition contact, said ignition contact energizing the ignition equipment of said motor vehicle and said accessory contact energizing the accessory loads of said motor vehicle, voltage regulating means having an input terminal and an output terminal, means connecting the output terminal of said voltage regulating means with said field winding, a resistor connected between the input terminal of said voltage regulating means and the accessory terminal of said ignition switch, a signal lamp connected between the input terminal of said voltage regulating means and the ignition terminal of said ignition switch, a bypassing circuit including the contacts of a relay connected between the input terminal of said voltage regulating means and a junction of said battery and one output terminal of said bridge rectifier network, means connecting one side of the coil winding of said relay between two of the rectifiers of said bridge rectifier network, and means connecting the opposite side of said relay coil winding with one of the output terminals of said bridge rectifier network.

4. A motor vehicle electrical system comprising, an alternating current generator having a three phase output winding and a field winding, an engine for driving said generator, an ignition system for said engine, a battery, a three phase full wave bridge rectifier network having input terminals connected with said output winding, said bridge rectifier network having an output terminal connected directly with one side of said battery, a common junction connected with one of the output terminals of said bridge rectifier network and one side of said battery, voltage regulating means of the vibrating contact type having an input terminal and an output terminal, means connecting the output terminal of said voltage regulating means with said field winding, a relay having relay contacts and an actuating coil, means connecting said relay contacts between said common junction and the input terminal of said voltage regulating means, means connecting said actuating coil between two of the diodes of said bridge rectifier network and one of the output terminals of said bridge rectifier network, and a circuit for initially energizing said field winding from said battery, said last-named circuit including manually operable switch means having an input terminal connected with said one side of said battery and having two output terminals connected respectively with a resistor and signal lamp said output terminal of said manually operable switch means that is connected with said signal lamp being connected to said ignition system.

5. A motor vehicle electrical system comprising, an alternating current generator having a three phase output winding and a field winding, an engine for driving said generator, an ignition system for said engine, a battery, a three phase full wave bridge rectifier network having first, second and third A.C. input terminals connected respectively with the phase windings of said output winding, said bridge rectifier network having a D.C. output terminal connected directly with one side of said battery, a junction connected with one of the D.C. output terminals of said bridge rectifier network and with one side of said battery, voltage regulating means of the vibrating contact type having an input terminal and an output terminal, means connecting the output terminal of said voltage regulating means with said field winding, a relay having relay contacts and an actuating coil, means connecting said relay contacts between said common junction and the input terminal of said voltage regulating means, means connecting said actuating coil between said first A.C. input terminal of said bridge rectifier network and one of the output terminals of said bridge rectifier network, a circuit for initially energizing said field winding from said battery, said last-named circuit including manually operable switch means having an input terminal connected with said one side of said battery and having two output terminals connected respectively with a resistor and signal lamp, said output terminal of said manually operable switch means that is connected with said signal lamp being connected to said ignition system, and means connected with said first A.C. input terminal of said bridge rectifier network for reducing humming of said relay.

6. The combination according to claim 5 wherein the means for reducing humming of the relay includes a diode connected between said first A.C. input terminal of said bridge rectifier network and said relay coil and a capacitor connected between one side of said diode and one side of said relay coil.

7. In combination, an alternating current generator having a three phase Y-connected output winding, a three phase full wave bridge rectifier network having first, second and third A.C. input terminals connected respectively with the phase windings of said output winding, said bridge rectifier network having first and second D.C. output terminals, a relay including an actuating coil and a pair of switch contacts, a circuit controlled by said switch contacts, means connecting one side of said actuating coil with one of the D.C. output terminals of said bridge rectifier network, a diode separate from said bridge rectifier network, means connecting said diode between said first A.C. input terminal of said bridge rectifier network and said relay actuating coil, and a capacitor connected between one side of said relay actuating coil and the junction of an opposite side of said relay actuating coil and said diode.

8. A motor vehicle electrical system comprising, an A.C. generator having a field winding and an output winding, an engine for driving said generator, an ignition system for said engine, a battery, rectifier means connected between said output winding and said battery for supplying charging current to said battery, switch means having a power input terminal and first and second power output terminals, said switch means in one position being operative to connect said power input terminal and said first and second output terminals, said switch means in a second position being operative to disconnect said second output terminal and said power input terminal, means connecting said ignition system with said second output terminal, means connecting said power input terminal to one side of said battery, a circuit for energizing said field winding including a common junction, a resistor connected between said common junction and said first power output terminal of said switch means, a signal lamp connected between said common junction and said second output terminal of said switch means, and a circuit including control means for directly connecting said common junction with one side of said battery when said A.C. generator develops a predetermined output voltage, said last-named circuit bypassing said resistor and signal lamp.

9. In a motor vehicle electrical system, the combination comprising, an alternating current generator having an output winding and a field winding, an engine for driving said generator, an ignition system for said engine, a battery, rectifier means having direct current output terminals connected with said battery and input terminals connected with said output winding, an ignition switch having a battery contact, an accessory contact and an ignition contact, said switch having a first position where said battery contact is connected with both said ignition and accessory contacts and having a second position where said battery contact and ignition contact are disconnected, said ignition system being connected with said ignition contact whereby said ignition system is energized when said battery contact and ignition contact are connected together, means connecting said battery contact with one side of said battery and with one of the output terminals of said bridge rectifier network, an energizing circuit for initially enerizing the field winding of said generator from said battery, said energizing circuit including a resistor connected in series with said field winding and said accessory contact and including a signal lamp connected in series with said field winding and said ignition contact, and a circuit connected in shunt with said resistor and signal lamp for energizing said field winding from said battery, said last-named circuit including control means which is operative to close said circuit in response to the development of a voltage by said generator.

10. A motor vehicle electrical system comprising, an alternating current generator having a field winding and an output winding, an engine for driving said generator, an ignition system for said engine, a battery connected with said rectifier means to be charged thereby, manually operable switch means including a battery contact, an ignition contact and a third contact, means connecting said battery contact with said battery, means connecting said ignition contact with said ignition system, a resistor, a signal lamp, means connecting said resistor in series with said field winding and said third contact, means connecting said signal lamp in series with said field winding and said ignition contact, said switch means in one position being operative to connect said resistor and signal light to said battery contact and being operative in another position to disconnect said battery contact from said ignition contact, and circuit means responsive to the output voltage of said rectifier means for bypassing said resistor and signal lamp when said generator has a predetermined voltage, said circuit means being operative to supply field current to said field winding.

11. In combination, an alternating current generator having a three phase output winding and a field winding, a three phase full wave bridge rectifier network having A.C. input terminals connected with the phase windings of the output winding and having D.C. output terminals, a battery connected directly across the output terminals of said bridge rectifier network to be charged thereby, a manually operable switch means, a relay having an actuating coil and switch contacts, a first circuit for initially energizing said field winding from said battery including said manually operable switch means, a second circuit connected in parallel with said first circuit for energizing said field winding from a junction of said battery and one of said D.C. output terminals of said bridge rectifier network including said relay contacts, means connecting one side of said relay actuating coil with one of said D.C. output terminals of said bridge rectifier network, a diode separate from the diodes of said bridge rectifier network connected in series between one of said A.C. input terminals of said bridge rectifier network and one side of said relay actuating coil, a capacitor connected between said one D.C. output terminal of said bridge rectifier and a junction of said diode and relay actuating coil, said diode and capacitor forming an antihumming circuit for said relay actuating coil.

References Cited by the Examiner
UNITED STATES PATENTS

| | | | |
|---|---|---|---|
| 3,037,124 | 5/1962 | Carlson | 307—10 X |
| 3,086,161 | 4/1963 | De Carbo et al. | 322—99 X |
| 3,138,751 | 6/1964 | Brewster | 323—22 X |

OTHER REFERENCES

Pavish, F. W., "Rectifiers and Circuits for D.C. Relays," Electronic Design, Nov. 15, 1956, pp. 22–23.

ORIS L. RADER, *Primary Examiner.*

LLOYD McCOLLUM, *Examiner.*

W. M. SHOOP, *Assistant Examiner.*